(12) United States Patent
Takahashi et al.

(10) Patent No.: US 10,843,934 B2
(45) Date of Patent: Nov. 24, 2020

(54) HIGH PURITY TUNGSTEN PENTACHLORIDE AND METHOD FOR SYNTHESIZING SAME

(71) Applicant: JX Nippon Mining & Metals Corporation, Tokyo (JP)

(72) Inventors: Hideyuki Takahashi, Ibaraki (JP); Hajime Momoi, Tokyo (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 127 days.

(21) Appl. No.: 16/073,288

(22) PCT Filed: Jan. 13, 2017

(86) PCT No.: PCT/JP2017/001086
§ 371 (c)(1),
(2) Date: Jul. 26, 2018

(87) PCT Pub. No.: WO2017/130745
PCT Pub. Date: Aug. 3, 2017

(65) Prior Publication Data
US 2019/0031526 A1  Jan. 31, 2019

(30) Foreign Application Priority Data

Jan. 28, 2016 (JP) ................. 2016-014662

(51) Int. Cl.
*C01G 41/04* (2006.01)
(52) U.S. Cl.
CPC .......... *C01G 41/04* (2013.01); *C01P 2006/80* (2013.01)
(58) Field of Classification Search
CPC ............................. C01G 41/04; C01P 2006/80
See application file for complete search history.

(56) References Cited

U.S. PATENT DOCUMENTS

2016/0305020 A1* 10/2016 Wu ......................... B01D 3/14
2019/0330076 A1* 10/2019 Liu ........................ C01G 41/04
2020/0031684 A1* 1/2020 Sundermeyer ......... C01G 41/04

FOREIGN PATENT DOCUMENTS

EP          3453679 A1   3/2019

OTHER PUBLICATIONS

Extended European Search Report for Application No. 17743976.7 dated Jul. 23, 2019, 7 pages.
Takashi Takuma et al., "Thermodynamic Properties of Tungsten Hexachloride and Tungsten Pentachloride", Journal of the Chemical Society of Japan, 1972, No. 5, pp. 865-873.
Translation of WIPO International Preliminary Report on Patentability, dated Aug. 7, 2018, 6 pages.
Partial English Translation of Takuma et al. Document, dated 1972, 2 pages.
McCann, E.L. et al., "Tungsten (V) Chloride", Inorganic Syntheses, 1971, vol. 13, pp. 150-154.
Brown, T. M., "Preparation and reactions of some lower tungsten halides and halide complexes", Iowa State University Digital Respository, 1963, pp. 25-27.
Thorn-Csanyi, E. et al., "A new route to the preparation of tungsten pentachloride", Journal of Molecule Catalysis, 1991, vol. 65, pp. 261-267.
Cotton, F. A. et al., "Tungsten pentachloride", Acta Crystallographica Section B, 1978, vol. 34, No. 9, pp. 2833-2834.
Crouch, P. C. et al., "The high yield synthesis of the tungsten (VI) oxyhalides WOCl4, WOBr4 and WO2Cl2 and some observations on tungsten (VI) bromide and tungsten (V) chloride", Journal of Inorganic and Nuclear Chemistry, 1970, vol. 32, pp. 329-333.
Korshunov, B. G. et al,. "Reaction of tungsten hexachloride with titanium, silicon, tin (II, IV), antimony (V) chlorides and with phosphoryl chloride", Zhurnal Neorganicheskoi Khimii, 1967, vol. 12, No. 12, pp. 3280-3282.
Kolesnichenko, V., et al., "Facile Reduction of Tungsten Halides with Nonconventional, Mild Reductants. I. Tungsten Tetrachloride: Several Convenient Solid-State Syntheses, a Solution Synthesis of Highly Reactive (WCL4)x, and the Molecular Structure of Polymeric Tungsten Tetrachloride", Inorg. Chem., 1998, vol. 37, No. 13, pp. 3257-3262.
International Search Report for PCT/JP2017/001086, dated Mar. 21, 2017, 4 pages.
Balcar et al., Ring Opening Metathesis Polymerization of Norbornene by WCl6: Formation of WCl5 and WCl4 and Their Catalytic Activity; J. Heyrovsky Institute of Physical Chemistry, Academy of Sciences of the Czech Republic, Collect. Czech. Chem. Commun. vol. 61, 1996, pp. 1353-1359.

* cited by examiner

*Primary Examiner* — Ngoc-Yen Nguyen
(74) *Attorney, Agent, or Firm* — Faegre Drinker Biddle & Reath LLP

(57) ABSTRACT

The purpose of the present invention is to safely synthesize high purity tungsten pentachloride at a higher yield and at a higher purity than in prior art. This method for producing tungsten pentachloride includes: a step of mixing a reducing agent selected from the group consisting of Bi, Hg, Sb, Ti, Al, P, and As with tungsten hexachloride uniformly in an inert atmosphere with a molar ratio of the tungsten hexachloride to the reducing agent being 2.8:1.0 to 3.2:1.0 to obtain a mixture; a step of heating the mixture of the reducing agent and the tungsten hexachloride to 80 to 210° C. at 13 Pa or lower and reducing the same; a step of heating the reduced product of the mixture of the reducing agent and the tungsten hexachloride to 120 to 290° C. at 66 Pa or lower and vacuum distilling the same to remove impurities; and a step of heating the reduced product from which impurities have been removed by the vacuum distillation to 140 to 350° C. at 13 Pa or lower and purifying the same by sublimation to obtain the tungsten pentachloride.

16 Claims, No Drawings

HIGH PURITY TUNGSTEN PENTACHLORIDE AND METHOD FOR SYNTHESIZING SAME

TECHNICAL FIELD

The present invention relates to high purity tungsten pentachloride and a method for safely synthesizing the high purity tungsten pentachloride with higher yield.

BACKGROUND ART

Conventionally, in order to synthesize $WCl_5$, a method for subjecting $WCl_6$ to hydrogen reduction at an appropriate level has been generally used. Such a conventional method has caused problems that when scaling up the system, an unreduced portion and an excessively reduced portion have been generated to form a $WCl_6$ residue or $WCl_4$, $WCl_2$, W and the like, resulting in a decrease in a content of tungsten pentachloride in a recovered product (compound purity), and that these unintended substances have inhibited the reaction when using tungsten pentachloride or have been mixed in a final product, so that a yield of the final product has been deteriorated. Also, the conventional method has not been suitable for practical use due to problems that it has been very difficult to control a flow rate of hydrogen and a temperature in the producing process, the yield has been low, a time required for completion of the reaction has been prolonged, and in terms of safety aspect, hydrogen gas might be leaked to cause explosion, and the like. Further, prior arts disclose, as a reduction method, a method of reduction/distillation in a sealed ampule using Bi, Hg, Sb or the like as a reducing agent. However, this method has caused a problem that $WCl_4$ and $WCl_2$ have been synthesized by excessive reduction, or an internal pressure of the sealed ampule would be increased and the ample might be ruptured. (Non-patent Documents 1 and 2)

CITATION LIST

Non-patent Document 1: Takuma, Kawakubo, "Thermodynamic Properties of Tungsten Hexachloride and Tungsten Pentachloride", The Chemical Society of Japan, 1972, No. 5, p. 865-873

Non-patent Document 2: V. Kolesnichenko, et al., Inorg. Chem., 1998, Vol.37, No.13, p. 3257-3262

SUMMARY OF INVENTION

Technical Problem

Thus, an object of the present invention is to provide a method for synthesizing tungsten pentachloride that can be safely produced as compared with the prior art, has a higher compound purity and further has higher purity relative to chlorine, tungsten and impurity elements other than an element(s) used for a reducing agent.

Solution to Problem

As a result of intensive studies, the present inventors have found that tungsten pentachloride that can be safely produced as compared with the prior art, has a higher yield and has higher purity can be synthesized by using high purity tungsten hexachloride as a starting material and performing reduction using a substance selected from the group consisting of high purity Bi, Hg, Sb, Ti, Al, P and As as a reducing agent, in combination with distillation under a reduced pressure.

Thus, the present invention includes the following aspects (1) to (10):

(1)

A method for producing tungsten pentachloride, comprising the steps of:
uniformly mixing at least one reducing agent selected from the group consisting of Bi, Hg, Sb, Ti, Al, P and As with tungsten hexachloride in a molar ratio of tungsten hexachloride:reducing agent of from 2.8:1.0 to 3.2:1.0 in an inert atmosphere to obtain a mixture;
reducing the mixture of the reducing agent and the tungsten hexachloride by heating the mixture at a temperature of from 80 to 210° C. under a pressure of 13 Pa or less;
subjecting the reduced mixture of the reducing agent and the tungsten hexachloride to distillation under a reduced pressure by heating the reduced mixture at a temperature of from 120 to 290° C. under a pressure of 66 Pa or less to remove impurities; and
subjecting the reduced product in which the impurities have been removed by the distillation under a reduced pressure to sublimation purification by heating the reduced product at a temperature of from 140 to 350° C. under a pressure of 13 Pa or less to obtain tungsten pentachloride.

(2)

The method for producing tungsten pentachloride according to (1), wherein the step of uniformly mixing the reducing agent with the tungsten hexachloride in the inert atmosphere to obtain the mixture comprises grinding the tungsten hexachloride and the reducing agent using an mortar or a ball mill in an inert atmosphere such that the maximum particle diameter of each of the tungsten hexachloride and the reducing agent is 300 μm or less, and uniformly mixing them to obtain a mixture.

(3)

The method for producing tungsten pentachloride according to (1) or (2), wherein the tungsten pentachloride has a compound purity of 95% by mass or more.

(4)

The method for producing tungsten pentachloride according to any one of (1) to (3), wherein the total content of metal impurities excluding the reducing agent is less than 10 ppm (purity 5N).

(5)

The method for producing tungsten pentachloride according to any one of (1) to (4), wherein the tungsten pentachloride comprises 1 ppm to 350 ppm of at least one element of the reducing agent.

(6)

The method for producing tungsten pentachloride according to any one of (1) to (5), wherein the tungsten pentachloride has a Mo content of 0.5 ppm or less.

(7)

Tungsten pentachloride, wherein the tungsten pentachloride has a compound purity of 95% by mass or more.

(8)

The tungsten pentachloride according to (7), wherein the tungsten pentachloride has a total content of metal impurities excluding at least one element used as a reducing agent of less than 10 ppm (purity 5N).

(9)

The tungsten pentachloride according to (7) or (8), wherein the tungsten pentachloride comprises 1 ppm to 350 ppm of at least one element used as a reducing agent.

(10)

The tungsten pentachloride according to any one of (7) to (9), wherein the tungsten pentachloride has a Mo content of 0.5 ppm or less.

Advantageous Effects of Invention

According to the present invention, the safety can be improved as compared with the prior art, and the compound purity of tungsten pentachloride present in tungsten chloride can be increased, so that the yield can be improved. Further, the production time can be shortened, and as a result, high purity tungsten tetrachloride can be synthesized at lower cost.

DESCRIPTION OF EMBODIMENTS

Hereinafter, the present invention will be described in detail by way of embodiments. The present invention is not limited to the specific embodiments as described below.

Synthesis of Tungsten Pentachloride

According to the present invention, tungsten pentachloride can be synthesized by a method including the steps of: uniformly mixing at least one reducing agent selected from the group consisting of Bi, Hg, Sb, Ti, Al, P and As with tungsten hexachloride in a molar ratio of tungsten hexachloride:reducing agent of from 2.8:1.0 to 3.2:1.0 in an inert atmosphere to obtain a mixture; reducing the mixture of the reducing agent and the tungsten hexachloride by heating the mixture at a temperature of from 80 to 210° C. under a pressure of 13 Pa or less; subjecting the reduced mixture of the reducing agent and the tungsten hexachloride to distillation under a reduced pressure by heating the reduced mixture at a temperature of from 120 to 290° C. under a pressure of 66 Pa or less to remove impurities; and subjecting the reduced product in which the impurities have been removed by the distillation under a reduced pressure to sublimation purification by heating the reduced product at a temperature of from 140 to 350° C. under a pressure of 13 Pa or less to obtain tungsten pentachloride.

Tungsten Hexachloride as Starting Material

The tungsten hexachloride used as a starting material may preferably be a material having high purity, for example, it may preferably have a purity of 5N or more.

Reducing Agent

The reducing agent may be any element as long as it is effective for reducing tungsten hexachloride. For example, the reducing agent that can be used is selected from the group consisting of Bi, Hg, Sb, Ti, Al, P, As and the like. Among them, Sb or Bi may be more preferably used.

Mixing

The reducing agent and tungsten hexachloride are uniformly mixed in an inert atmosphere. The inert atmosphere can include, for example, Ar and $N_2$. The mixing may be preferably carried out using a ball mill or a mortar. The reducing agent and tungsten hexachloride can be mixed such that the molar ratio of tungsten hexachloride:reducing agent is, for example, in a range of from 2.8:1.0 to 3.2:1.0, and preferably in a range of from 2.9:1.0 to 3.1:1.0, and more preferably at 3:1. The particle diameter of the ground and mixed material may be 300 µm or less, and more preferably 100 µm or less, which will be able to improve the reactivity of the reduction reaction.

Reduction

The mixture of the reducing agent and tungsten hexachloride is reduced by heating them. The heating reduction is carried out, for example, by heating them in an atmosphere under a reduced pressure, preferably a pressure of 13 Pa or less, for example for 1 hour or more, preferably 2 to 24 hours, for example at a temperature of from 80 to 210° C., or 80 to 110° C., or about 105° C. When Sb is used as the reducing agent, the heating may be preferably carried out, for example, at a temperature of from 80 to 110° C., or about 105° C.

Distillation under Reduced Pressure

After the mixture of the reducing agent and tungsten hexachloride is subjected to the heating reduction, the resulting reduced product is subjected to distillation under a reduced pressure to remove impurities. The distillation under a reduced pressure is carried out by heating the reduced product, for example, under a pressure of 66 Pa or less, preferably 13 Pa or less, for example for 1 hour or more, preferably 2 to 24 hours, for example at a temperature of from 120 to 290° C., or 120 to 130° C. When Sb is used as the reducing agent, the distillation under a reduced pressure may be preferably carried out, for example under a pressure of 13 Pa or less, and for example at a temperature of from 120 to 130° C.

Sublimation Purification

The reduced product in which the impurities have been removed by the distillation under a reduced pressure is purified by sublimation to recover high purity tungsten pentachloride. The sublimation purification is carried out, for example, by heating the reduced product under a pressure of 13 Pa or less, and preferably 1.3 Pa or less, for example for 1 hour or more, preferably 2 to 48 hours, and for example at a temperature of from 140 to 350° C., preferably from 150 to 170° C. This treatment is preferably carried out one or more times, preferably two or more times, to increase the purity. The recovery of the sublimate can be carried out, for example, by means of air cooling or water cooling, more preferably in a dry room or an inert atmosphere having a dew point of −30° C. or less.

High Purity Tungsten Pentachloride

Tungsten pentachloride ($WCl_5$) obtained by sublimation purification has high purity, for example, a purity of 4N5 which means a content (compound purity) of tungsten pentachloride of 95% by mass or more, preferably 99% or more and the total content of impurities comprised of chlorine and tungsten which are constituent elements, and metal element(s) excluding the reducing agent, of less than 50 ppm; and preferably a purity of 5N which means the above total content of less than 10 ppm. The tungsten pentachloride may contain 1 ppm to 350 ppm, preferably 1 to 100 ppm, of the element(s) of the reducing agent. Particularly, the Mo content may be 0.5 ppm or less.

The high purity tungsten pentachloride according to the present invention can be advantageously used as a material for raw materials of electronic members (a material for MO-CVD raw materials or a material for ALD raw materials) and a material for raw materials of functional chemical catalysts.

Reduction of Tungsten Hexachloride in Present Invention

In the present invention, the reducing agent efficiently reduces tungsten hexachloride ($WCl_6$). The present invention can shorten the reaction time to be less than 1/10, as compared with conventionally used hydrogen reduction in the same treating amount. The compound purity of the resulting product was about 80 wt % according to the conventional method, but the compound purity can be increased to be 95 wt % or more according to the present invention. Further, according to the present invention, the metal impurities can be decreased to be less than 10 ppm. Furthermore, it is possible to synthesize $WCl_5$ containing an appropriate amount of a Group V element(s) acting as a dopant, which can be preferably used as a suitable raw material for subsequent use by selecting a Group V element(s) to be subsequently added. Further, in the present invention, the treatment under a reduced pressure provides a direct sublimation purification effect without any liquid phase. The high purity starting material lowers the melting point and promotes the reaction. Preferably, the reactivity can be increased by setting the particle diameter of the starting material to 100 μm or less. Further, a low-oxygen and uniform reaction can be achieved by performing the previous mortar mixing in an inert atmosphere.

It should be noted that the "compound purity" of tungsten pentachloride as used herein means a percentage of $WCl_5$, among five tungsten chlorides having valences 2 to 6 (compositional formulae: $WCl_2$, $WCl_3$, $WCl_4$, $WCl_5$, $WCl_6$) and $WOCl_4$, an oxychloride.

Further, the analysis of the content of metal impurities in the present invention was carried out with Inductively Coupled Plasma (ICP) Optical Emission Spectroscopy (ICP-OES) for analysis of an element (Sb or Bi) used as the reducing agent, and with Inductively Coupled Plasma Mass Spectroscopy (ICP-MS:ICP-Mass Spectrometry) for analysis of metal impurities contained in trace amounts of ppm order or sub-ppm order, other than the element(s) of the reducing agent. The results are shown in Table 2. Particularly, for the ICP mass spectrometry method according to the present invention, Ag, Na, Cd, Co, Fe, In, Mn, Ni, Pb, Zn, Cu, Cr, Tl, Li, Be, Mg, Al, K, Ca, Ga, Ge, As, Sr, Sn, Sb, Bi, Ba, Mo, U and Th are targeted as elements with little effect of molecular ion interference that will cause decreased sensitivity and measurement errors due to overlap of mass numbers, and those less than the detection limit value of the ICP mass spectrometry were considered to be not contained and excluded from the total content of metal impurities.

EXAMPLES

Hereinafter, the present invention will be described in more detail by providing Examples. The present invention is not limited to the following Examples.

Example 1

High purity $WCl_6$ and high purity Sb were mixed in a molar ratio of 2.8:1 in a nitrogen atmosphere using a mortar such that the total mass of these substances was 1 kg.

The mixture was then placed in a vacuum container and maintained under about 13 Pa or less while constantly evacuating the atmosphere, and heated for about 2 hours to reduce the mixture. The heating temperature was 105° C.

The mixture was then subjected to sublimation (distillation under a reduced pressure) by heating the mixture under about 66 Pa and at 130° C. for about 1 hour to remove impurities.

The mixture was then subjected to sublimation purification by heating the mixture under about 13 Pa or less and at 160° C. for about 1 hour. Subsequently, the product was recovered in a nitrogen atmosphere and enclosed in an ampoule to obtain high purity $WCl_5$ powder.

The conditions of Example 1 are summarized in Table 1. The ICP spectroscopy analysis values of high purity $WCl_5$ obtained in Example 1 are shown in Table 2.

Examples 2 to 5

Examples 2 to 5 were carried out by changing some conditions from Example 1. The conditions of Examples 1 to 5 are summarized in Table 1. The ICP spectroscopy analysis values of high purity $WCl_5$ obtained in Example 5 are shown in Table 2.

Comparative Examples 1 to 6

Comparative Examples 1 to 6 were carried out by changing some conditions from Example 1 or omitting some steps. The conditions of Comparative Examples 1 to 6 are summarized in Table 1. The ICP spectroscopy analysis values of $WCl_5$ obtained in Comparative Example 4 are shown in Table 2.

TABLE 1

|  | Example 1 | Example 2 | Example 3 | Example 4 | Example 5 | Comp. 1 | Comp. 2 | Comp. 3 | Comp. 4 | Comp. 5 | Comp. 6 |
| --- | --- | --- | --- | --- | --- | --- | --- | --- | --- | --- | --- |
| Material Purity | 5N | 5N | 5N | 5N | 5N | 4N | 5N | 5N | 5N | 5N | 5N |
| Reducing Agent | Sb | Sb | Sb | Sb | Bi | Sb | Sb | Sb | Sb | Sb | Sb |
| Mixing Apparatus | Mortar | Mortar | Ball Mill | Mortar | Mortar | Mortar | Mortar | No mixing | Mortar | Mortar | Mortar |
| Mixing Atmosphere | N2 | N2 | N2 | N2 | N2 | N2 | N2 | — | N2 | N2 | N2 |
| Mixing ratio (WCl6:Reducing Agent) | 2.8:1.0 | 3.0:1.0 | 3.0:1.0 | 3.2:1.0 | 3.0:1.0 | 3.0:1.0 | 3.0:1.0 | 3.0:1.0 | 3.0:1.0 | 3.0:1.0 | 3.0:1.0 |
| Particle Size after Grinding | 200 um | 200 um | 100 um | 200 um | 200 um | 200 um | 500 um | 700 um | 200 um | 200 um | 200 um |
| Reduction | 13 Pa | 13 Pa | 13 Pa | 13 Pa | 13 Pa | 13 Pa | 13 Pa | 13 Pa | Closed System, Pressurized | 13 Pa | 13 Pa |

TABLE 1-continued

|  | Example 1 | Example 2 | Example 3 | Example 4 | Example 5 | Comp. 1 | Comp. 2 | Comp. 3 | Comp. 4 | Comp. 5 | Comp. 6 |
|---|---|---|---|---|---|---|---|---|---|---|---|
| Reduction Time | 12 h | 2 h | 2 h | 24 h | 24 h | 2 h | 2 h | 2 h | 2 h | 2 h | 24 h |
| Reduction Temperature | 105° C. | 105° C. | 105° C. | 105° C. | 210° C. | 105° C. | 105° C. | 105° C. | 105° C. | 105° C. | 105° C. |
| Distillation under Reduced Pressure | 66 Pa | 66 Pa | 13 Pa | 13 Pa | 13 Pa | 66 Pa | 66 Pa | 66 Pa | 66 Pa | None | 13 Pa |
| Distillation Time | 1 h | 2 h | 2 h | 24 h | 24 h | 2 h | 2 h | 2 h | 2 h | — | 24 h |
| Distillation Temperature | 130° C. | 130° C. | 130° C. | 130° C. | 290° C. | 130° C. | 130° C. | 130° C. | 130° C. | — | 130° C. |
| Sublimation Purification | 13 Pa | 13 Pa | 13 Pa | 1.3 Pa | 1.3 Pa | 13 Pa | 13 Pa | 13 Pa | 13 Pa | None | 1.3 Pa |
| Sublimation Time | 1 h | 2 h | 2 h | 24 h | 24 h | 2 h | 2 h | 2 h | 2 h | — | 24 h |
| Sublimation Temperature | 160° C. | 160° C. | 160° C. | 160° C. | 300° C. | 160° C. | 160° C. | 160° C. | 160° C. | — | 360° C. |
| Number of Times | Once | Once | Once | Twice | Twice | Once | Once | Once | Once | — | Once |
| Product | 95.0 | 97.0 | 96.0 | 99.2 | 95.2 | 94.0 | 90.0 | 85.0 | 82.0 | 60.0 | 0.8 |

TABLE 2

|  | Ag | Na | Cd | Co | Fe | In | Mn | Ni | Pb | Zn | Cu | Cr | Tl | Li | Be | Mg |
|---|---|---|---|---|---|---|---|---|---|---|---|---|---|---|---|---|
| Example 1 | <0.1 | 0.8 | <1 | <0.1 | 3.1 | <0.1 | <0.1 | <1 | 0.1 | <1 | <1 | <1 | <0.1 | <0.1 | <0.1 | 0.2 |
| Example 2 | <0.1 | 0.8 | <1 | <0.1 | 3.1 | <0.1 | <0.1 | <1 | 0.1 | <1 | <1 | <1 | <0.1 | <0.1 | <0.1 | 0.2 |
| Example 3 | <0.1 | 0.9 | <1 | <0.1 | 3.1 | <0.1 | <0.1 | <1 | 0.1 | <1 | <1 | <1 | <0.1 | <0.1 | <0.1 | 0.2 |
| Example 4 | <0.1 | 0.8 | <1 | <0.1 | 3.1 | <0.1 | <0.1 | <1 | 0.1 | <1 | <1 | <1 | <0.1 | <0.1 | <0.1 | 0.2 |
| Example 5 | <0.1 | <1 | <1 | <0.1 | 3.1 | <0.1 | <0.1 | <1 | 0.1 | <1 | <1 | <1 | <0.1 | <0.1 | <0.1 | 0.2 |
| Comp. 1 | <0.1 | 0.8 | <1 | <0.1 | 13.5 | <0.1 | <0.1 | <1 | 1.1 | <1 | <1 | 2.1 | <0.1 | <0.1 | <0.1 | 0.2 |
| Comp. 2 | <0.1 | 0.8 | <1 | <0.1 | 3.1 | <0.1 | <0.1 | <1 | 0.1 | <1 | <1 | <1 | <0.1 | <0.1 | <0.1 | 0.2 |
| Comp. 3 | <0.1 | 0.2 | <1 | <0.1 | 3.1 | <0.1 | <0.1 | <1 | 0.1 | <1 | <1 | <1 | <0.1 | <0.1 | <0.1 | 0.2 |
| Comp. 4 | <0.1 | 1.7 | <1 | <0.1 | 3.3 | <0.1 | <0.1 | <1 | 0.1 | <1 | <1 | <1 | <0.1 | <0.1 | <0.1 | 0.2 |
| Comp. 5 | <0.1 | 3.1 | <1 | <0.1 | 3.1 | <0.1 | <0.1 | <1 | 0.1 | <1 | <1 | <1 | <0.1 | <0.1 | <0.1 | 0.2 |
| Comp. 6 | <0.1 | 0.3 | <1 | <0.1 | 3.1 | <0.1 | <0.1 | <1 | 0.1 | <1 | <1 | <1 | <0.1 | <0.1 | <0.1 | 0.2 |

|  | Al | K | Ca | Ga | Ge | As | Sr | Sn | Sb | Bi | Ba | Mo | U | Th | Total[*1] | Remarks |
|---|---|---|---|---|---|---|---|---|---|---|---|---|---|---|---|---|
| Example 1 | 0.5 | 3.2 | <0.1 | <0.1 | <0.2 | <0.5 | <0.1 | <0.1 | 200 | <0.1 | <0.1 | 0.5 | <0.1 | <0.1 | 8.4 | Sb reduction |
| Example 2 | 0.5 | 3.3 | <0.1 | <0.1 | <0.2 | <0.5 | <0.1 | <0.1 | 150 | <0.1 | <0.1 | 0.5 | <0.1 | <0.1 | 8.5 | Sb reduction |
| Example 3 | 1.9 | 3.0 | <0.1 | <0.1 | <0.2 | <0.5 | <0.1 | <0.1 | 150 | <0.1 | <0.1 | 0.5 | <0.1 | <0.1 | 9.7 | Sb reduction |
| Example 4 | 0.5 | 3.2 | <0.1 | <0.1 | <0.2 | <0.5 | <0.1 | <0.1 | 1.5 | <0.1 | <0.1 | 0.5 | <0.1 | <0.1 | 8.4 | Sb reduction |
| Example 5 | 0.5 | 0.8 | <0.1 | <0.1 | <0.2 | <0.5 | <0.1 | <0.1 | <0.1 | 350 | <0.1 | 0.5 | <0.1 | <0.1 | 5.2 | Bi reduction |
| Comp. 1 | 8.8 | 9.5 | <0.1 | <0.1 | <0.2 | <0.5 | <0.1 | <0.1 | 150 | <0.1 | <0.1 | 2.5 | <0.1 | <0.1 | 38.6 | Sb reduction |
| Comp. 2 | 0.5 | 2.8 | <0.1 | <0.1 | <0.2 | <0.5 | <0.1 | <0.1 | 3.5% | <0.1 | <0.1 | 0.5 | <0.1 | <0.1 | 8.0 | Sb reduction |
| Comp. 3 | 0.5 | 2.5 | <0.1 | <0.1 | <0.2 | <0.5 | <0.1 | <0.1 | 6.0% | <0.1 | <0.1 | 0.5 | <0.1 | <0.1 | 7.1 | Sb reduction |
| Comp. 4 | 0.5 | 5.7 | <0.1 | <0.1 | <0.2 | <0.5 | <0.1 | <0.1 | 5.0% | <0.1 | <0.1 | 0.5 | <0.1 | <0.1 | 12 | Sb reduction |
| Comp. 5 | 0.5 | 3.5 | <0.1 | <0.1 | <0.2 | <0.5 | <0.1 | <0.1 | 4.2% | <0.1 | <0.1 | 0.5 | <0.1 | <0.1 | 11 | Sb reduction |
| Comp. 6 | 0.5 | 1.8 | <0.1 | <0.1 | <0.2 | <0.5 | <0.1 | <0.1 | 15 | <0.1 | <0.1 | 0.5 | <0.1 | <0.1 | 6.5 | Sb reduction |

([*1]excluding elements less than detection lower limit value and reducing agent element)
(unit is wtppm, except for indication of %)

Synthesis Equipment

The operation of Example 1 was carried out with synthesis equipment which was provided with interconnected vacuum vessels and which could continuously carrying out each step of heating reduction, removal of impurities by sublimation (distillation under a reduced pressure) and sublimation purification.

INDUSTRIAL APPLICABILITY

According to the present invention, high purity tungsten pentachloride can be synthesized with an improved yield, improved safety, shortened production time, and as a result, at a lower cost. The present invention is an industrially useful invention.

The invention claimed is:
1. A method for producing tungsten pentachloride, comprising the steps of:
uniformly mixing at least one reducing agent selected from the group consisting of Bi, Hg, Sb, Ti, Al, P and As with tungsten hexachloride in a molar ratio of tungsten hexachloride:reducing agent of from 2.8:1.0 to 3.2:1.0 in an inert atmosphere to obtain a mixture;
reducing the mixture by heating the mixture at a temperature of from 80 to 210° C. under a pressure of 13 Pa or less thereby producing a crude mixture;
heating the crude mixture to a temperature of from 120 to 290° C. under a pressure of 66 Pa or less to remove impurities; and
subjecting the resulting mixture obtained from the heating step to sublimation purification by heating the resulting mixture at a temperature of from 140 to 350° C. under a reduced pressure of 13 Pa or less to obtain a purified tungsten pentachloride.
2. The method for producing tungsten pentachloride according to claim 1, wherein the step of uniformly mixing the reducing agent with the tungsten hexachloride in the inert atmosphere to obtain the mixture comprises grinding the tungsten hexachloride and the reducing agent using an mortar or a ball mill in an inert atmosphere such that the maximum particle diameter of each of the tungsten hexachloride and the reducing agent is 300 pm or less, and uniformly mixing them to obtain the mixture.

3. The method for producing tungsten pentachloride according to claim 1, wherein the tungsten pentachloride has a compound purity of 95% by mass or more.

4. The method for producing tungsten pentachloride according to claim 1, wherein the total content of metal impurities excluding the reducing agent is less than 10 ppm (purity 5N).

5. The method for producing tungsten pentachloride according to claim 1, wherein the tungsten pentachloride comprises 1 ppm to 350 ppm of at least one element of the reducing agent.

6. The method for producing tungsten pentachloride according to claim 1, wherein the tungsten pentachloride has a Mo content of 0.5 ppm or less.

7. The method for producing tungsten pentachloride according to claim 2, wherein the tungsten pentachloride has a compound purity of 95% by mass or more.

8. The method for producing tungsten pentachloride according to claim 2, wherein the total content of metal impurities excluding the reducing agent is less than 10 ppm (purity 5N).

9. The method for producing tungsten pentachloride according to claim 7, wherein the total content of metal impurities excluding the reducing agent is less than 10 ppm (purity 5N).

10. The method for producing tungsten pentachloride according to claim 2, wherein the tungsten pentachloride comprises 1 ppm to 350 ppm of at least one element of the reducing agent.

11. The method for producing tungsten pentachloride according to claim 3, wherein the tungsten pentachloride comprises 1 ppm to 350 ppm of at least one element of the reducing agent.

12. The method for producing tungsten pentachloride according to claim 4, wherein the tungsten pentachloride comprises 1 ppm to 350 ppm of at least one element of the reducing agent.

13. The method for producing tungsten pentachloride according to claim 2, wherein the tungsten pentachloride has a Mo content of 0.5 ppm or less.

14. The method for producing tungsten pentachloride according to claim 3, wherein the tungsten pentachloride has a Mo content of 0.5 ppm or less.

15. The method for producing tungsten pentachloride according to claim 4, wherein the tungsten pentachloride has a Mo content of 0.5 ppm or less.

16. The method for producing tungsten pentachloride according to claim 5, wherein the tungsten pentachloride has a Mo content of 0.5 ppm or less.

* * * * *

UNITED STATES PATENT AND TRADEMARK OFFICE
CERTIFICATE OF CORRECTION

PATENT NO. : 10,843,934 B2  
APPLICATION NO. : 16/073288  
DATED : November 24, 2020  
INVENTOR(S) : Hideyuki Takahashi and Hajimi Momoi Page 1 of 1

It is certified that error appears in the above-identified patent and that said Letters Patent is hereby corrected as shown below:

In the Claims

In Column 7, Line 64:
Change -- pentachioride -- to -- pentachloride --

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*